Sept. 19, 1944. J. W. ORENDORFF 2,358,532
TRACTOR-MOUNTED PLANTER
Filed Feb. 13, 1942 3 Sheets-Sheet 1
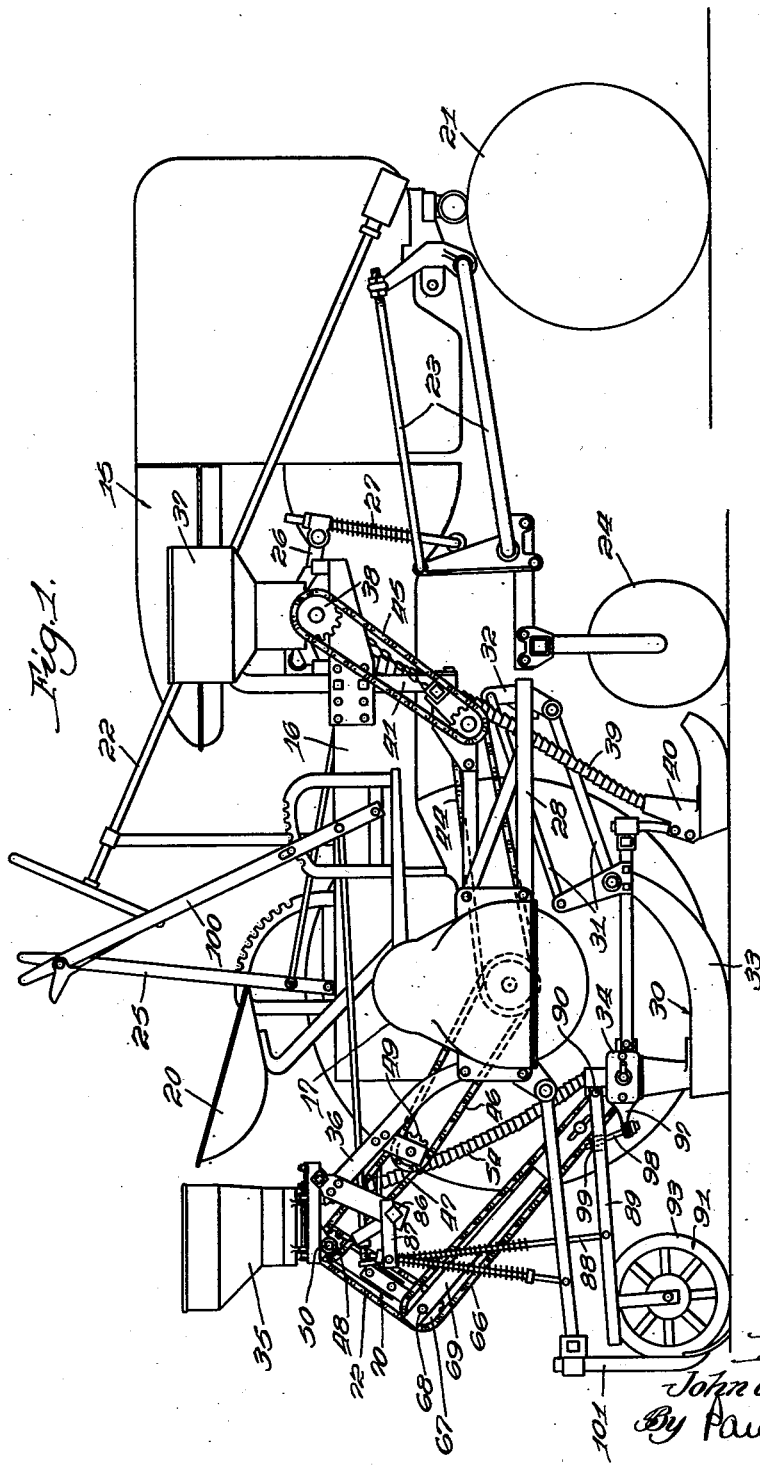

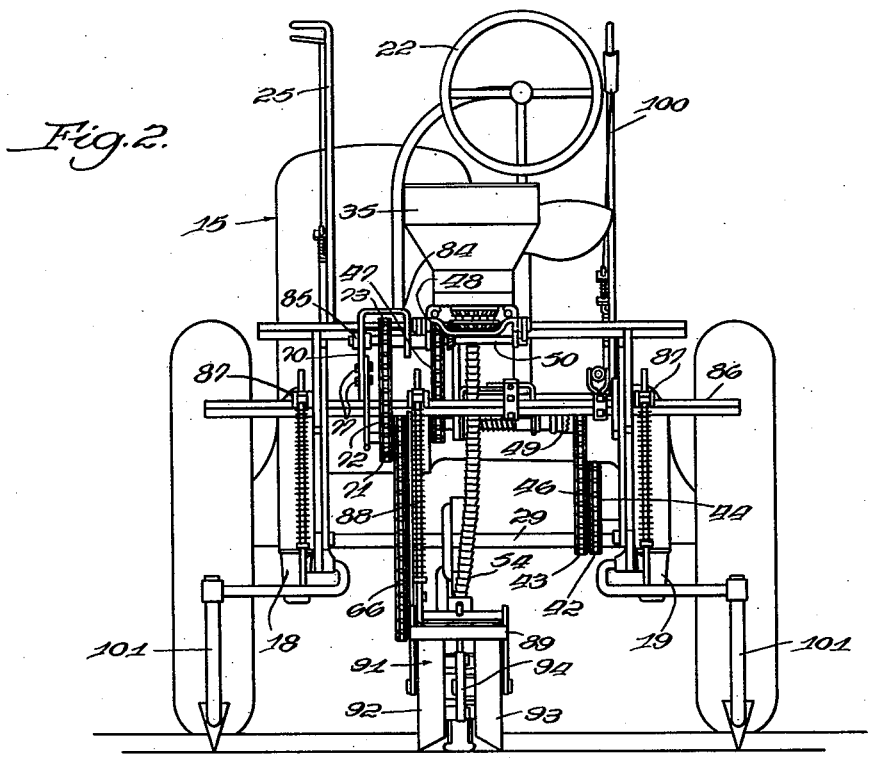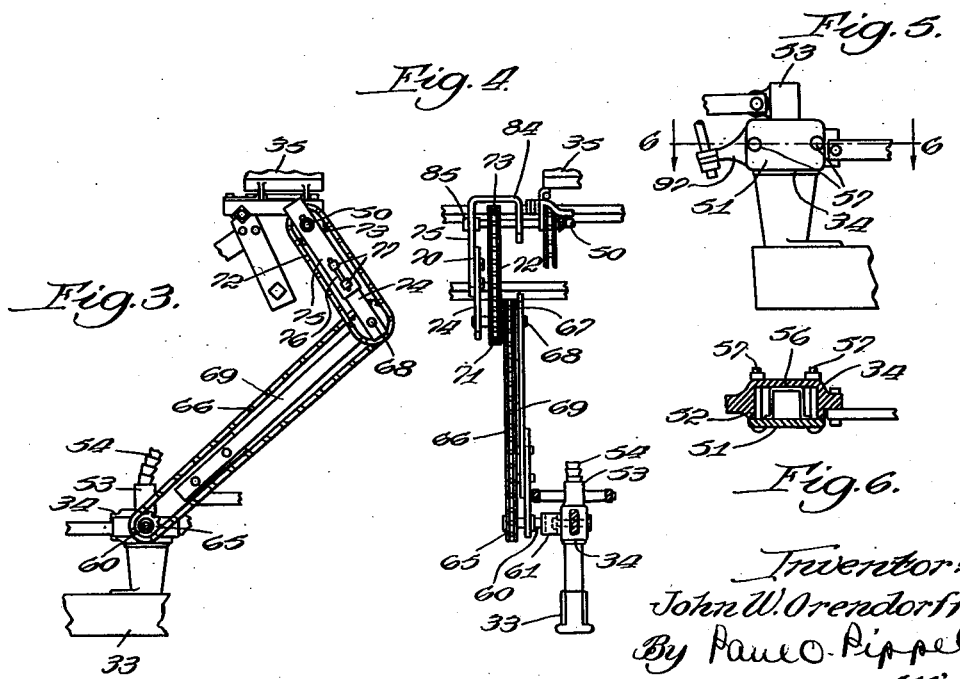

Inventor:
John W. Orendorff.
By Paul O. Pippel
Atty.

Patented Sept. 19, 1944

2,358,532

UNITED STATES PATENT OFFICE 2,358,532

TRACTOR-MOUNTED PLANTER

John W. Orendorff, Canton, Ill., assignor to International Harvester Company, a corporation of New Jersey Application February 13, 1942, Serial No. 430,796

10 Claims. (Cl. 111—34)

This invention relates to tractor-mounted planters and more particularly to a hill-drop type of planter.

It is an object of the present invention to convert planters normally adapted for the continuous planting of seed along a furrow into a hill-drop type of planter in such a manner that only minimum parts are necessary to affect this conversion of a regular planter into a hill-drop type of planter.

It is another object of the invention to provide a novel means for connecting planters to the type of tractors having depending axle housings, wherein the depending axle housings can be made to serve as a support for a tool bracket structure to which individual tools can be connected for vertical movement.

It is still another object of the invention to provide drive means adapted to be connected between the power mechanism of the tractor and the vertically movable seed boot which will adapt itself as the seed boot moves vertically to provide a steady drive to the valve structure thereof, and wherein this drive mechanism will be in the form of an articulated chain and sprocket arrangement.

According to the present invention, there has been provided a tractor of a type having a rear axle structure with depending axle housings to which is respectively connected two forwardly extending bracket structures, between the forward ends of which there is connected a transversely extending tool-carrying member. To this tool-carrying member is connected the seed boot structure for vertical movement with respect thereto, and this seed boot structure extends rearwardly to a location in rear of the rear axle structure and in alinement with a seed hopper structure also located rearwardly of the rear axle structure and supported therefrom. Power mechanism is provided on the tractor for driving the seed hopper structure, and extending from this power mechanism is an articulated chain and sprocket structure which extends for connection to a valve structure located in the vertically movable seed boot. As the seed boot structure moves vertically while in operation, the articulated chain and sprocket arrangement will adapt itself so that the chain drive will remain always tight and effective for the driving of the seed valve. This articulated arrangement is so constructed that it can be assembled on the regular planting arrangement to convert the regular planting arrangement into a planting arrangement of the hill-drop type. The seed boot normally has a cover plate over a chamber portion when the same is being used for regular planting. When the regular planter is converted, this cover is removed and replaced by a seed valve structure which is adapted to be driven by the articulated arrangement. One of the sprockets of the articulated arrangement is so constructed that it can be readily attached to the shaft without the necessity for the reassembling of the articulated drive arrangement.

For other objects and for a better understanding of the invention reference may be had to the following detailed description taken in connection with the accompanying drawings, in which:

Figure 1 is a side elevational view of a tractor having a planting arrangement with its improved features connected to the tractor;

Figure 2 is a rear elevational view of the planting arrangement and of the tractor;

Figure 3 is a detailed side view of the articulated chain and sprocket arrangement and the seed boot;

Figure 4 is a detailed rear view of the articulated chain and sprocket arrangement and seed boot;

Figure 5 is a detailed side elevational view of the seed boot showing its usual cover plate in place;

Figure 6 is a sectional view taken along the line 6—6 of Figure 5;

Figure 7:
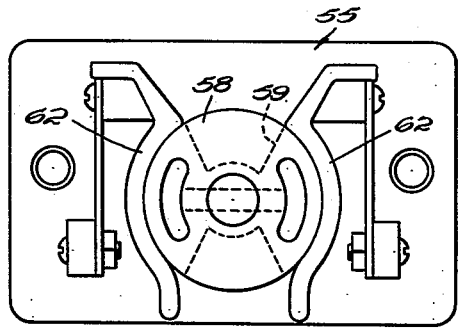
Figure 7 is a detail view of the valve structure adapted for insertion into the seed boot chamber portion.

Referring particularly to Figures 1 and 2, there is shown a tractor 15 having a longitudinally extending body portion 16 and a rear axle structure 17 with depending axle housings 18 and 19. On the rear axle structure is located an operator's station 20. The forward portion of the tractor is supported on a wheel mounting 21 adapted to be steered by a steering mechanism 22 accessible to the operator's station 20.

On this forward portion of the tractor is connected for vertical movement, as by means of a parallel link arrangement 23, bedding equipment 24 adapted to form the beds on which the planting is done. This bedding equipment is adapted to be lifted to a transport position by manually adjustable means 25 accessible to the operator's station 20 and arranged to act upon a crank arm 26 which is in turn connected with the bedding equipment 24 by means of a lifting link 27.

Extending forwardly from the respective depending axle housings 18 and 19 are the bracket structures 28 to the forward ends of which is connected a transversely extending tool bar member 29. This transversely extending tool bar member lies beneath the central part of the tractor and forwardly of the rear axle structure 17 thereof and serves for the attachment to the tractor of a seed boot structure 30. The attachment of the seed boot structure is made by means of parallel links 31, the forward ends of which are in turn connected to the transverse member 29 by means of a bracket 32. The seed boot structure 30 includes a furrow opener 33 and a chamber portion 34. The parallel links 31 are of sufficient length to allow the seed boot structure to be located under the rear axle structure and to extend to a location in rear thereof for vertical alinement with a seed hopper structure 35 connected by means of brackets 36 to the depending axle housings 18 and 19 of the rear axle structure 17.

On the longitudinally extending tractor body portion 16 is connected for longitudinal adjustment a fertilizer hopper structure 37 having a sprocket 38 adapted to be driven. Extending downwardly from the fertilizer hopper structure 37 is a tube 39 connected at its lower end to a fertilizing distributing boot 40 rigidly carried on the seed boot structure 30. The hopper structure 37 can be adjusted longitudinally by adjustment of the same with respect to a bracket structure 41 on the tractor. When it is desired to use the fertilizing arrangement alone, without the planting arrangement, the hopper structure can be adjusted forwardly to be in better vertical alinement with the bedding equipment 24. If the bedding equipment is not used, the cultivating or other equipment is supported by the parallel links 23. The seed boot 40 would then be attached to this equipment and would follow up and down with the same as it proceeds over the ground. For the present illustration, however, the fertilizing equipment is being used along with the planting arrangement.

On the depending axle housing 19 there are sprockets 42 and 43. The sprocket 42 is connected to the sprocket 38 of the hopper structure 37 by means of chains 44 and 45 and as the planting proceeds fertilizer will be deposited in the bed formed by the bedding equipment 24. The sprocket 43 is connected through chains 46 and 47 to a sprocket 48 on the seed hopper structure 35. Intermediate the chains 46 and 47 is a drive clutch arrangement 49 supported on the brackets 36.

Referring particularly to Figure 2, it will be noted that the sprocket 48 is on a shaft 50 supported by the seed hopper structure 35. From this shaft the parts of the seed hopper device are driven. When it is desired to add a hill-drop mechanism to the regular planting arrangement, the shaft 50 which is preferably of considerable length extends laterally to the side to allow for attachment thereto of the hill-drop mechanism.

Figure 8:
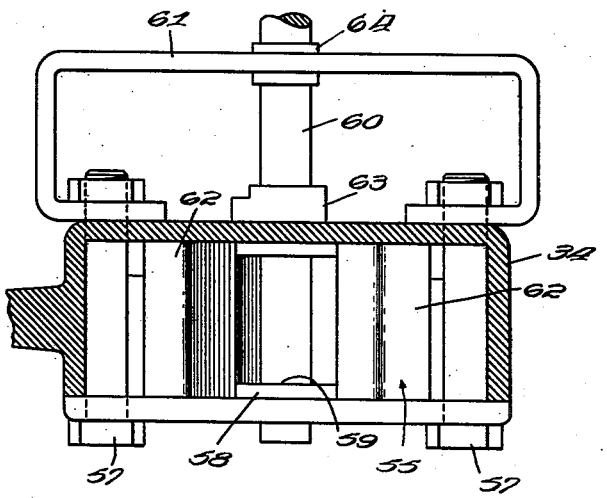
Figure 8 is a view similar to Figure 6 but with the seed valve structure replacing the cover plate on the chamber portion.

Referring now particularly to Figures 5 and 6, there is illustrated in detail the seed boot structure as arranged for normal planting without the hill-drop mechanism. To the chamber portion 34 is connected a cover plate 51 arranged to cover an opening 52 in the side of the chamber portion. In the upper end of the chamber portion is an inlet opening 53 to which is connected a flexible seed tube 54. Seeds pass into the chamber 34 by way of this inlet opening 53 and are distributed in a seed furrow formed by the runner 33. This chamber portion 34 is enlarged so that it can receive the seed valve structure 55, as shown in Figures 7 and 8. During the regular planting operation, this chamber portion 34 need not be so large. Hence, there is provided a restricting element 56 carried by the cover plate 51 and adapted to extend into the chamber portion when said cover plate is in place so that the same will be in vertical alinement with the inlet opening 53. This restricting element 56 is removable with the cover plate. The cover plate is held secure to the chamber portion 34 by fastening bolts 57.

When it is desired to convert the regular planter into a planter of the hill-drop type, the cover plate 51 and its restricting element 56 are removed from the chamber portion 34. As shown in Figures 7 and 8, there is inserted in its place the valve structure 55, and this valve structure is connected to the chamber portion by means of the same fastening bolts 57. The valve structure includes a rotatable element 58 having openings 59 in its periphery for the purpose of receiving seeds from the inlet opening 53 of the chamber portion 34. This rotatable element 58 is carried on a shaft 60 which extends through a wall of the chamber portion 35 opposite to the opening 52 and is supported laterally and outside of the chamber portion by means of a bracket structure 61 connected to the chamber portion 34 by the same fastening means 57 that connects the hill-drop structure 55 to the chamber portion 34. The rotatable element 58 is confined at its sides by spring biased wiper elements 62. These wiper elements 62 limit the amount of seed deposited in the peripheral openings at 59 and are resilient to prevent jamming or destruction of the seed as the same passes through the valve to the seed furrow formed by the runner 33. Fitted within the chamber portion 34 is a bearing 63 for the shaft 60 and on the bracket 61 is a second bearing 64. The shaft 60 extends to a location beyond the bracket 61 and as viewed in Figures 3 and 4 has a sprocket 65 thereon.

While in operation the seed boot structure 34 has vertical movement and thus an articulated chain and sprocket mechanism is provided for the driving of the hill-drop valve 55. From the sprocket 65 there extends upwardly a chain 66 which is connected to a sprocket 67 carried on a shaft 68 which forms the pivotal connection for two articulated links 69 and 70. On this same shaft 68 is also connected a second sprocket 71 which is connected by means of a chain 72 to a sprocket 73 carried on the shaft 50. The link 70 includes overlapping parts 74 and 75. The part 75 has a slot 76, while the part 74 carries the tightening bolts 77 arranged to lie within the slot 76. The parts 74 and 75 can thus be extended or shortened to effect tightening of the chain 72 or to permit a replacement of the sprocket 73 for a sprocket of different size in order that the speed of operation of the hill-drop valve 55 may be altered with the ultimate effect being to change the spacing between hills and seed furrow.

Figure 9:
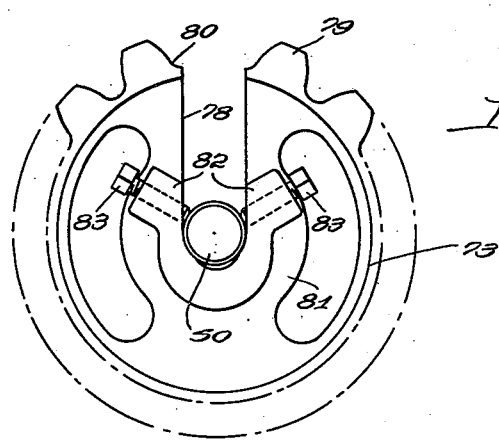
Figure 9 is an enlarged view of one of the sprockets of the articulated arrangement and illustrating its connection with the shaft.

In order to permit removal of the sprocket 73 without requiring disconnection of the articulated arrangement from the shaft 50, the gear, as viewed in Figure 9, is provided with a radially extending slot 78 adapted to contain the shaft 50. This slot 78 has the width of a tooth portion 79 plus a part of the width of two grooved portions 80. Thus, from this type of sprocket one of the tooth portions 79 is omitted. This omission of the tooth portion is not sufficient to interfere with the operation of the chain 72 over the sprocket 73. The sprocket 73 also includes a hub portion 81 into which the shaft 50 extends. This hub portion 81 has formed thereon flanged portions 82 into which tightening screws 83 extend. These flange portions 82 extend at such an angle that the tightening screws 83 in being tightened through them will abut the shaft 50 at such an angle as to act upon the shaft above the transverse diameter of the same within the hub portion 81 and to force the shaft into the bottom of the slot. It should thus be apparent that with this type of a sprocket, the sprocket can be readily removed and replaced by another sprocket of different size. Also in the assembly of the articulated arrangement to the shaft 50, the connection of the sprocket 73 can be more readily made. The upper end of the link 73 is bent over to provide a portion 84, and this portion is carried on the shaft 50. The shaft 50 also extends through the unbent portion of the link 70 in which there is provided a bearing 85. It should now be apparent that the link 70 is free to rotate on the shaft 50 and also that the links 69 and 70 can buckle with respect to each other about the connecting pin 68. Thus, freedom of vertical movement is given to the seed boot structure without affecting the driving connections of the same with the shaft 50. It should thus be apparent that the invention provides a hill-drop drive mechanism which can be readily used for converting a regular planter into a hill-drop type of planter and which requires only minimum parts for effecting this result. The connection can be readily made with the driving connection of the hopper structure, and the regular seed boot can still be used since the latter is so constructed that parts within the same can be replaced by the hill-drop valve.

Carried on the bracket 36 is a rockable structure 86 having lifting arms 87 thereon. One of these lifting arms is connected by means of a lift rod 88 with a covering wheel structure 89 pivoted to the said boot structure 30, as indicated at 90. This covering wheel follows the seed boot structure to cover the seed previously dropped in the seed furrow. The covering wheel structure 89 includes a covering wheel 91. This covering wheel is made up of two wheel parts 92 and 93, as shown in Figure 2. These parts 92 and 93 are adapted for connection to a hub structure 94.

On the seed boot structure 30, there is provided a projection 97 to which is connected a lost motion link 98 which extends to the covering wheel structure 89 and on the upper end of which is provided a collar 99. As the rockable structure is rocked in a clockwise direction by a manually adjustable mechanism 100 accessible to the operator's station 20, lifting movement is imparted through the lift rod 88 to pivot the covering wheel structure 89 about the pivot point 90 thereby taking up the motion on the connecting rod 98 so that the covering wheel structure will abut against the collar 99 to thereby effect lifting of the seed boot structure about its connection with the transverse member 29. This same rockable structure 36, through its arms, may also serve to lift track sweep tools 101 connected respectively at opposite sides of the tractor and to the respective depending axle housings 18 and 19. Thus, mere operation of the manually adjustable means 100 will take the complete planting arrangement out of operation. Associated with the drive mechanism of both the fertilizing drive and the planter drive are clutch drive mechanisms whereby the respective driving mechanisms will be also placed automatically out of operation.

While various changes may be made in the detail construction of the invention, it shall be understood that such changes shall be within the spirit and scope of the present invention as defined by the appended claims.

What is claimed is:

1. In combination, a supporting structure, a material dispensing arrangement connected to the supporting structure and including a material depositing boot for delivering material within a prepared ground furrow, means for converting this dispensing arrangement into a hill-drop arrangement including a hill-drop drive mechanism, said material depositing boot having a chamber portion and a cover plate removable from the chamber portion, and a hill-drop valve structure adapted to replace the cover plate and to extend within the chamber portion of the depositing boot, said hill-drop valve structure including means adapted for connection with the hill-drop drive mechanism.

2. In combination, a seed-planting arrangement including a supporting structure, a seed boot connected to the supporting structure for vertical movement with respect thereto, seed dispensing mechanism for normally delivering seed to the seed boot for deposit along a seed row, means for converting the planting arrangement into a hill-drop arrangement including a hill-drop drive mechanism, said seed boot being formed of a main structure and of parts removable therefrom, and a hill-drop valve structure adapted to replace the removable parts of the seed boot and connected to the hill-drop drive mechanism to be driven by the same.

3. In combination, a seed-planting arrangement including a supporting structure, a seed boot connected to the supporting structure for vertical movement with respect thereto, seed dispensing mechanism for normally delivering seed to the boot for deposit along a seed row, means for converting the planting arrangement into a hill-drop arrangement including a hill-drop drive mechanism, said seed boot being formed of a main structure and of a cover plate removable from the main structure to leave an exposed opening, and a hill-drop valve structure adapted to fit within the exposed opening and to close the same to thereby replace said cover plate, said hill-drop valve structure having a shaft adapted to be driven, said hill-drop drive mechanism operatively connected to said shaft.

4. In combination, a seed-planting arrangement including a supporting structure, a seed boot connected to the supporting structure for vertical movement with respect thereto, seed dispensing mechanism for normally delivering seed to the seed boot for deposit along a seed furrow, means for converting the planting arrangement into a hill-drop arrangement including a hill-drop drive mechanism, said seed boot being formed of a main structure having an enlarged chamber portion therein with a narrowed entrance opening leading thereto, and of a part removable from the enlarged chamber portion, said latter part having a restricted passage portion adapted for alinement with the narrowed entrance opening to further confine the seed within the enlarged chamber, and a hill-drop valve structure adapted to replace the removable part and to fill up the enlarged chamber portion, and means for connecting the hill-drop drive mechanism with the hill-drop valve mechanism.

5. In combination, a seed-planting arrangement including a supporting structure, a seed boot connected to the supporting structure for vertical movement with respect thereto, seed dispensing mechanism for normally delivering seed to the seed boot for deposit along a seed furrow, means for converting the planting arrangement into a hill-drop arrangement including a hill-drop drive mechanism, said seed boot being formed of a main structure, of a removable cover plate and of means for fastening the cover plate to the main structure, a hill-drop valve structure adapted to replace the removable cover plate and including a shaft adapted to be driven and extending laterally from the main structure for connection with said hill-drop drive mechanism, and bracket means for supporting the shaft externally of the main structure, and said fastening means adapted to serve as the means for securing the hill-drop valve structure and the shaft bracket means to the main structure of the seed boot.

6. In combination, a supporting structure, a material dispensing arrangement connected to the supporting structure and including a dispensing boot structure adapted to have vertical movement during the dispensing operation, a power mechanism associated with the supporting structure, a valve structure carried by the boot structure and having a part adapted to be driven, and an articulated chain and sprocket mechanism extending from the power source to the part of the valve structure adapted to be driven, said chain and sprocket mechanism including a plurality of endless chains pivoted for relative angular movement.

7. In combination, a supporting structure, a material dispensing arrangement connected to the supporting structure and including a dispensing boot structure adapted to have vertical movement during the dispensing operation, a power mechanism associated with the supporting structure, a valve structure carried by the boot structure and having a part adapted to be driven, and an articulated chain and sprocket mechanism extending from the power source to the part of the valve structure adapted to be driven, said articulated chain and sprocket mechanism including a plurality of endless chains pivoted for relative angular movement, each said chain comprising a pair of flights and at least one of said chains being adjustable lengthwise of said flights to effect tightening thereof.

8. In combination, a tractor having a power take-off mechanism, a seed-planting structure connected to the tractor and including a seed boot structure adapted to have vertical movement during the planting operation, a valve structure associated with said seed boot structure and having a part adapted to be driven, and an articulated chain and sprocket mechanism including a plurality of endless chains pivoted for relative angular movement extending from the power take-off mechanism to the part of the valve structure adapted to be driven.

9. In combination, a supporting structure, a seed-planting arrangement carried by the supporting structure and including a seed hopper structure having parts adapted to be driven, a seed boot structure having parts removable therefrom, seed communication means extending between the hopper structure and the seed boot structure, and a hill-drop mechanism for converting the planting arrangement into a planting arrangement of the hill-drop type, said latter mechanism including a valve structure adapted to replace the removable parts of the seed boot structure and drive mechanism extending between the driven parts of the hopper structure and the valve structure.

10. In combination, a tractor having power mechanism, a planting arrangement carried by the tractor and including a seed hopper structure having parts adapted to be driven by the power mechanism, a seed boot structure adapted to have vertical movement while depositing seed in a prepared furrow and having parts removable therefrom, seed communication means for connecting the seed hopper structure with the seed boot structure, and a hill-drop mechanism for converting the above-related planting arrangement into a planting arrangement of the hill-drop type, said latter mechanism including a hill-drop valve structure adapted to replace removable parts of the seed boot structure, and an articulated chain and sprocket drive mechanism connected between the driven parts of the seed hopper structure for driving the latter.

JOHN W. ORENDORFF.